United States Patent

Shimizu

[11] 4,372,664
[45] Feb. 8, 1983

[54] MOISTURE- AND DUST-PROOF DEVICE FOR ROTATING OPERATION PART OF CAMERA

[75] Inventor: Masami Shimizu, Tokyo, Japan

[73] Assignee: Canon Kabushiki Kaisha, Tokyo, Japan

[21] Appl. No.: 321,206

[22] Filed: Nov. 13, 1981

[30] Foreign Application Priority Data

Nov. 19, 1980 [JP] Japan .......................... 55-165502[U]

[51] Int. Cl.³ ...................... G03B 17/02; G03B 17/08
[52] U.S. Cl. ....................................... 354/288; 354/64
[58] Field of Search ..................... 354/64, 288, 266; 352/242; 277/81 R, 88; 350/61, 67

[56] References Cited

U.S. PATENT DOCUMENTS

| | | | |
|---|---|---|---|
| 3,653,306 | 4/1972 | Takahama | 354/64 |
| 4,041,507 | 8/1977 | Ko et al. | 354/64 |
| 4,097,878 | 6/1978 | Cramer | 354/64 |
| 4,244,591 | 1/1981 | Umetsu | 354/266 |
| 4,281,837 | 8/1981 | Hashimoto | 354/266 |

Primary Examiner—L. T. Hix
Assistant Examiner—Alan Mathews
Attorney, Agent, or Firm—Toren, McGeady & Stanger

[57] ABSTRACT

A moisture- and dust-proof device for a rotating operation member of a camera has a receiving seat for the rotating operation member, such as a film sensitivity value setting dial or a shutter speed setting dial, formed with a visco-elastic material such as rubber. The receiving seat is secured to a hole arranged to have the operation shaft of the rotating operation member inserted therein. Then, a washer made of Teflon or the like is inserted in between the receiving seat and the rotating operation member to impart a drip- and moisture-proof effect as well as to permit rotating operation of the rotating operation member.

3 Claims, 3 Drawing Figures

MOISTURE- AND DUST-PROOF DEVICE FOR ROTATING OPERATION PART OF CAMERA

BACKGROUND OF THE INVENTION

1. Field of the Invention

This invention relates to an improvement on a rotating operation part of a camera provided with a moisture- and dust-proof device which is capable of preventing water drops, dust and the like from penetrating into a camera through a rotating operation part thereof.

2. Description of the Prior Art

The automation of cameras of late and the applications of electronics thereto have caused a sudden increase in the number of electric components and parts to be incorporated in cameras. Integrated circuits thus have come to be used for cameras. To facilitate assembling and placing these electric parts and integrated circuits within cameras, they are mounted on substrates. Circuit substrates thus obtained are either inserted in between a pentagonal prism and an upper cover or in the neighborhood thereof or they are arranged between a die casting part of a camera and the bottom cover thereof.

However, the circuit substrates arranged in this manner are vulnerable to external influences because on the upper cover of the camera, there are provided operation members such as film winding and rewinding operation members, which have a shaft extending through holes provided in the upper cover. In the bottom cover, there is also provided a hole for inserting the driving shaft of an electric motor drive unit. It is inevitable that these holes leave some clearances in the upper and bottom covers. Such a clearance is prone to allowing dust, rain water or the like to enter the interior of the camera. When a camera is exposed to rain, for example, water enters the interior of the camera through the clearance existing in the upper cover. The water then tends to cause an electrolytic corrosion of the terminals of a circuit substrate by electrolysing them. If a terminal of the circuit substrate which is provided with an expensive integrated circuit for control is electrolytically corroded in this manner, the camera must be repaired by replacing the whole assembly of the circuit substrate including the expensive integrated circuit. This results in a high cost of repair. Further, intrusion of dust through such a clearance into the camera causes the electromagnet of the camera to generate an insufficient attracting force or it may cause a short circuit between terminals or acceleration of electrolytic corrosion when water enters the interior of the camera.

To solve these problems of conventional cameras, there has been proposed a method in which a rubber ring used at a rotating part of a camera for an antiskid purpose is extended in part for use as a sealing member.

This sealing method of the prior art is shown in sectional view in FIG. 1 of the accompanying drawings as applied to a shutter speed setting dial of a camera. Referring to FIG. 1, an upper cover 1 is secured to a camera body which is not shown. A shutter dial 2 has the shaft thereof interlocked with an internal mechanism of the camera. To improve operability, the shutter dial 2 is provided with an operation rubber ring 3, which is attached to the dial 2. The upper cover 1 is provided with a shaft inserting hole with a guide ring 5 secured to the periphery of the hole by caulking. With this ring 5 serving as a guide, an adjustment washer 4 which is made of metal or a resin material having a lower coefficient of friction than a viscoelastic material is fitted. The operation rubber ring 3 is extended to form an extended part 3a as shown in the drawing. A clearance existing at the operation part is plugged by pushing this part 3a against the adjustment washer 4. In the drawing, reference numeral 6 indicates rain drops. With the operation part arranged as shown in FIG. 1, when the shutter dial 2 is turned, a frictional force between the operation rubber ring 3 and the adjustment washer 4 causes the latter to turn in contact with the upper surface of the upper cover 1 almost as one unified body with the shutter dial 2. FIG. 2 is an enlarged sectional view showing an abutting condition between the adjustment washer 4 and the operation rubber ring 3. As shown, in the above example of the prior art arrangement, the washer 4 and the extended part 3a of the rubber ring 3 are linearly in contact with each other. The linear contact does not give a sufficient sealing effect. Further, it is not desirable for a product such as a camera that should give a high grade impression to have a rubber part exposed to the outside. The use of the rubber part for obtaining a moisture- and dust-proof construction, therefore, degrades the appearance of the camera. The present invention is directed to the elimination of the above stated shortcomings of the prior art arrangement.

SUMMARY OF THE INVENTION

It is a general object of the invention to provide a moisture- and dust-proof device which is to be interposed in between a rotating operation member and a camera body and which comprises a visco-elastic member and a member having a low coefficient of friction.

The above and further objects, features and advantages of the invention will become apparent from the following detailed description of an embodiment thereof taken in connection with the accompanying drawings.

DETAILED DESCRIPTION OF PREFERRED EMBODIMENT

Figure 1:
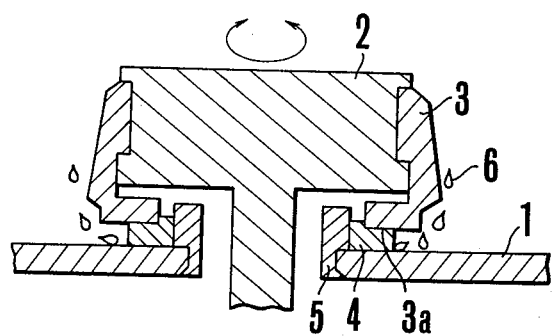
FIG. 1 is a sectional view showing a moisture- and dust-proof device of the prior art.
Figure 2:
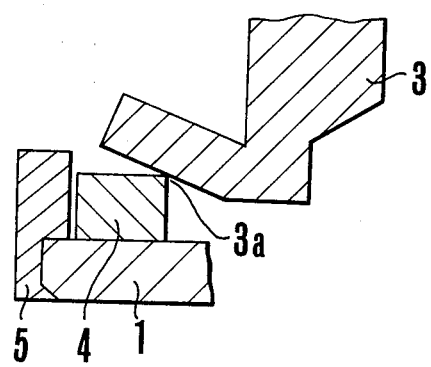
FIG. 2 is an enlarged sectional view showing a part of the device shown in FIG. 1.
Figure 3:
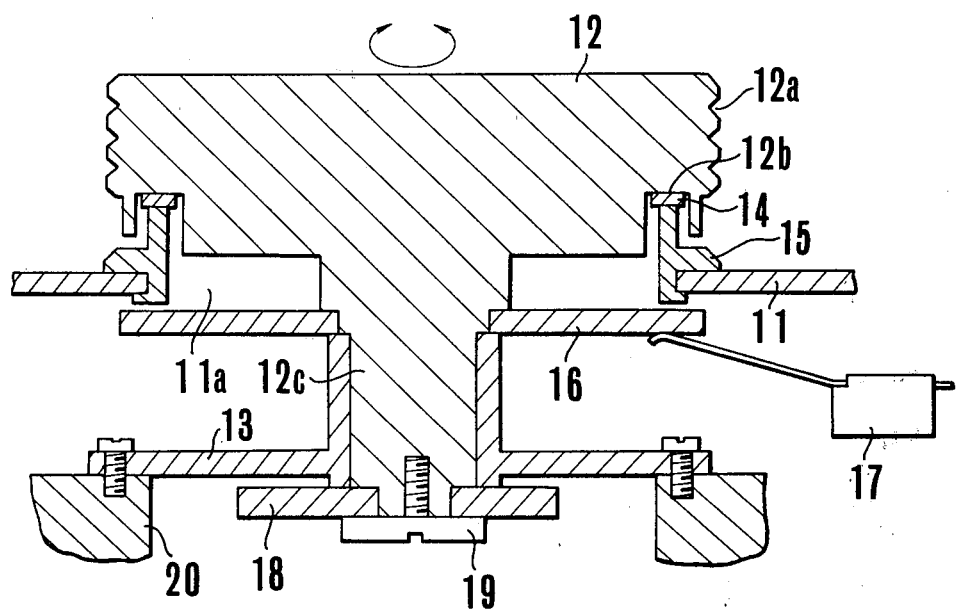
FIG. 3 is a sectional view showing a moisture- and dust-proof device which comprises an embodiment of the present invention.

FIG. 3 shows a shutter dial operation part provided with a moisture- and dust-proof device according to the present invention.

Referring to FIG. 3, an upper cover 11 is secured to the body of a camera. A shutter dial 12 which is formed into one body is provided with a no-slip knurled part 12a for improvement in operability. The upper cover 11 is provided with an operation shaft inserting hole 11a. The shaft 12c of the shutter dial 12 is inserted in this hole 11a. The fore end of the shaft 12c has a mechanical shutter time control cam 18 attached thereto by means of a screw 19. At an intermediate point of the shaft 12c, there is provided a variable resistor 16 for introducing information. The shaft 12c is rotatably supported by a receiving plate 13 which is secured to the camera body 20. The shaft 12c is thus pivotally attached to the camera body 20. The varaible resistor 16 is provided with a brush 17. A ring-shaped member 15 which is formed with a visco-elastic material such as rubber or the like is fitted onto the periphery of the operation shaft inserting hole 11a of the upper cover 11. After fitting of the ring-shaped member 15, one end portion of the member 15 is fixedly cemented to the upper cover 11. The other end of the ring-shaped member 15 is formed into a shutter dial receiving seat and is disposed within a peripheral grooved part 12b of the shutter dial 12. Within this peripheral grooved part 12b, a sliding washer 14 which is made of a low friction resin material such as Teflon is interposed in between the above stated receiving seat 15 and the dial 12. The above stated shutter dial seat 15 is arranged to push the washer 14 against the grooved part 12b and thus to adjust the thickness of the washer 14.

With the device arranged as shown in FIG. 3, when the shutter dial 12 is turned, the washer 14 is pushed against the dial 12 by the pressure exerted by the rubber ring 15 while the washer 14 is permitted to turn with low friction.

With the moisture- and dust-proof device according to the invention applied to a camera, water drops and dust or the like can be completely prevented from entering the interior of the camera from outside thereof. Besides, in accordance with the invention, not only the appearance of the camera can be improved with simplified construction but also the operability of the operation part of the camera can be improved. In addition to these advantages, the Teflon washer can be easily obtained by punching it out of a Teflon sheet. It is therefore possible to prepare Teflon washers of several different thicknesses, so that adjustment of the thrust of the upper cover, the shutter dial, etc. can be accomplished without difficulty. These are great advantages of the invention.

While a specific embodiment of the invention has been shown and described in detail to illustrate the application of the inventive principles, it will be understood that the invention may be embodied otherwise without departing from such principles.

What is claimed is:

1. A moisture- and dust-proof device for a camera, comprising a ring-shaped visco-elastic member which has a receiving seat formed at one end thereof for receiving an operation member of said camera and which has another end secured to the periphery of an operation member inserting hole provided in the external wall of said camera, said one end of said ring-shaped member being disposed within a peripheral grooved part of said operation member; and a washer which is made of a resin material having a low coefficient of friction and is interposed between the inner side of the peripheral grooved part of said operation member and said receiving seat of said ring-shaped member.

2. A device according to claim 1, wherein said ring-shaped member is made of rubber.

3. A device according to claim 1, wherein said washer is made of Teflon.

* * * * *